United States Patent [19]

Mizell

[11] Patent Number: 4,551,290
[45] Date of Patent: Nov. 5, 1985

[54] METHOD OF FABRICATING HOLLOW PLASTIC OBJECTS AND APPARATUS THEREFOR

[76] Inventor: James A. Mizell, 13311 Kelly St., Garden Grove, Calif. 92644

[21] Appl. No.: 673,570

[22] Filed: Nov. 21, 1984

[51] Int. Cl.⁴ ............................................. B29D 27/04
[52] U.S. Cl. ................................. 264/46.6; 264/101; 264/250; 264/257; 264/269; 249/160; 249/163; 441/74
[58] Field of Search .................. 264/46.6, 101, 250, 264/257, 269; 249/160, 163; 441/74

[56] References Cited

U.S. PATENT DOCUMENTS

| | | | |
|---|---|---|---|
| 3,487,134 | 12/1969 | Burr | 264/46.6 |
| 3,802,010 | 4/1974 | Smith | 9/310 B |
| 3,929,549 | 12/1975 | Smith | 9/310 B X |
| 4,119,583 | 10/1978 | Filip et al. | 264/46.5 X |
| 4,268,571 | 5/1981 | McCarthy | 264/46.6 X |
| 4,383,955 | 5/1983 | Rubio et al. | 264/46.6 |

FOREIGN PATENT DOCUMENTS

| | | | |
|---|---|---|---|
| 211422 | 10/1957 | Australia | |
| 251057 | 1/1963 | Australia | 264/46.6 |

*Primary Examiner*—Philip Anderson
*Attorney, Agent, or Firm*—Leonard Tachner

[57] ABSTRACT

A process for fabricating a closed, generally flat plastic object such as a surfboard, in one embodiment comprises the steps of:

(a) providing a disassemblable mold having at least four parts comprising a bottom part, a top part and a pair of side rail parts, the interior surface of said mold having the desired shape of the exterior surface of said object;

disassembling said mold and applying a clear gel coat to the interior surface of each said mold part;

(c) applying laminations of a resin and reinforcing material mixture to each of said mold parts;

(d) applying a layer of toluene diisocyanate to at least said top and bottom parts;

(e) subjecting said top and bottom parts to a vacuum until said layers of toluene diisocyanate are each firmly adhered to the respective laminations of said mixture;

(f) affixing the side rail parts to the bottom part forming a cavity therebetween;

(g) coating the interior of the cavity with a resin and reinforcing material mixture;

(h) allowing the resin mixture to become structurally strong;

(i) closing said cavity by connecting said top part to said rail parts; and (j) allowing the resulting assemby to cure.

A hollow multi-port mold for use in the process is configured to permit easy access to the object surfacs during manufacture.

7 Claims, 10 Drawing Figures

METHOD OF FABRICATING HOLLOW PLASTIC OBJECTS AND APPARATUS THEREFOR

BACKGROUND OF THE INVENTION

1. Field of the Invention

The present invention relates generally to the manufacture of plastic objects and more particularly fiberglass reinforced polyester articles which may be foam-filled for use as surfboards, boats and the like.

2. Prior Art

Until recently foamed-filled objects such as surfboards were fabricated from the inside out. For example, a block of rigid foam was shaped by cutting and sanding to the desired shape and the shaped block was coated with reinforced resin, sanded, smoothed and coated with a decorative coating. However, it has been recognized that such steps are time consuming and involve substantial hand labor, causing the finished parts to be expensive. Furthermore, because of the amount of hand labor required, no two objects were exactly same and the skill of the craftsman was too important an ingredient in the appearance of the final object.

Various methods have been used in an attempt to form foam-filled hollow objects from a resin shell. Such patents include Australian Pat. Nos. 211,422; 242,233 and 251,057. In addition, such method are disclosed in U.S. Pat. Nos. 2,753,642; 2,879,793; 3,487,134; 3,673,617; 3,802,010; 3,929,549; 4,065,337; 4,073,049; 4,119,583; 4,256,803; 4,268,571 and 4,383,955.

The typical method of forming a hollow object is to form two mating halves and then join them along their outer edge as typified by Australian Pat. No. 251,057. The difficulty with this method is that the joint is typically formed at an inherent point of weakness and if the object, such as a surfboard, strikes a rock or other obstruction it is very likely to split along the seam. Other edge treatments are handled by forming a flange along the outer edge which again forms a point of weakness as well as causing an unsightly rim around the edge of the product. Such method is shown in U.S. Pat. No. 4,065,337 particularly in FIG. 16 and reference character 17. Other objects are joined in a manner which does not have any particular strength and rely upon the foam for strength such as typified by U.S. Pat. No. 4,119,583 in FIG. 2. Thus there is a need for a process for forming a hollow object made from resin which has a smooth exterior surface and which does not have a point of weakness. However, perhaps just as importantly, there is a need for a process for forming a hollow object made from resin in which during the construction of the object, the interior of the surface thereof is readily accessible to permit relatively easy and therefore cost effective manufacture of such objects. Furthermore, there is a need for a process for accomplishing such fabrication in which the structure of the object is inherently strong utilizing surfaces which are resilient and durable even when such objects are subjected to substantial impact against hard objects.

SUMMARY OF THE INVENTION

The present invention relates primarily to a process for fabricating a closed resin object such as a surfboard and to the mold or apparatus used in such process. The process utilizes the steps of providing a disassemblable mold having at least four parts comprising a bottom part, a top part, and a pair of side rail parts, the interior surface of the mold having the desired shape of the exterior surface of the object. The process further utilizes the step of disassembling the mold into its constituent parts and applying a clear gel coat to the interior surface of each such part. Next laminations of a resin and reinforcing material mixture such as fiberglass are applied to the interior surface of each of the mold parts. In a preferred embodiment of the invention, the next step comprises applying a layer of toluene diisocyanate to at least the top and bottom parts of the mold and subjecting those parts to a vacuum such as by means of a vacuum bag and a vacuum pump until the layers of toluene diisocyanate are each firmly adhered to the respective laminations previously applied to the parts. The next step in the process comprises affixing the side rail parts to the bottom part and attaching an elongated mold to the side rail parts. The elongated mold preferably has an L-shaped protrusion extending inwardly into the cavity of the mold parts, the bottom of the L-shaped protrusion directed towards the center of the cavity. The interior of the cavity, including the inwardly facing portion of the L-shaped portion of the elongated mold, is then coated with a resin and reinforcing material mixture such as fiberglass thereby forming an L-shaped step along the opening of the cavity. The resin mixture is allowed to become structurally strong and the elongated mold is removed thereby exposing an L-shaped step about the opening in the cavity. The process then continues with application of strips of resin and reinforcing material mixture to the L-shaped step and closing the cavity by connecting the top part to the rail parts and then allowing the resulting assembly to cure. In the case of surfboard manufacture using the present invention, it is quite common thereafter to add a curable foam to the interior of the cured assembly.

The method of the present invention provides a number of significant advantages relative to the prior art. Perhaps most significantly of these advantages is the substantial reduction in labor costs and material costs made possible by the more efficient use of materials because the mold of the present invention acts like a container during fabrication of the object. Furthermore, the process of the present invention is relatively easy to effectively communicate to relatively unskilled laborers who may thereafter carry out the steps of the process with relatively low levels of labor skill required. Additionally, the process of the present invention significantly increases the rate of object production because a significant number of steps required in the prior art have been obviated. More specifically, as a result of the method of the present invention, the cured final object need not be polished, sanded, shaped or hot coated because, unlike the prior art, in the present invention the object is made out of a mold and in effect made in reverse. In an additional embodiment of the process of the invention, a urethane elastomer is sprayed onto the laminated resin and reinforcing material mixture instead of the layer of toluene diisocyanate. No vacuum is needed in that embodiment.

An additional significant advantage is derived by use in the present invention of the step of applying a layer of toluene diisocyanate and subjecting that material to a vacuum to adhere it to the respective laminations of a resin and reinforcing material mixture such as fiberglass. This step significantly enhances the structural integrity of the object which is of particular importance in application to surfboard manufacture because of the significant amount of structural battering to which surfboards are normally subjected.

The novel mold used in the process described and claimed herein, is also highly advantageous in that it renders the manufacturing process one that can be accomplished by laborers having a lower level of skill. In addition, because of the mold of the invention it is more likely that the resulting structure will be properly fabricated without any inadvertent weak spots or inadvertent structural defects. Such defects can be avoided in the present invention because the novel mold described and claimed herein provides ready access to all of the surfaces of the mold interior during construction using the process of the present invention. Furthermore, the novel mold of the present invention is uniquely designed to facilitate the application of a vacuum to mold parts to apply the toluene diisocyanate.

OBJECTS OF THE INVENTION

It is therefore a principal object of the present invention to provide a novel method for fabricating hollow plastic objects such as surfboards, which method significantly reduces the cost of manufacture while providing a superior product of increased structural integrity as compared to the prior art.

It is an additional principal object of the present invention to provide a novel mold apparatus for fabricating a closed, generally flat object made from plastic resin such as a surfboard, the mold being unique in that it permits manufacture of such objects with a significant reduction in the risk of inadvertent defects while at the same time increasing access to the object being manufactured.

It is still an additional principal object of the present invention to provide a process for fabricating a closed, generally flat object such as a surfboard which process utilizes the novel step of applying a layer of high structural integrity plastic material utilizing vacuum application.

It is still an additional principal object of the present invention to provide a process for fabricating a closed, generally flat object such as a surfboard wherein such process comprises the step of applying a layer of either toluene diisocyanate or a urethane elastomer to at least a portion of the object during manufacture.

It is an additional principal object of the present invention to provide a novel mold apparatus that may be advantageously used in the process of fabricating a closed, generally flat object such as a surfboard which mold apparatus includes at least two parts comprising a majority of the surface area of the mold and which parts are adapted to be contained within a vacuum chamber or bag during the process.

BRIEF DESCRIPTION OF THE DRAWINGS

The aforementioned objects and advantages of the present invention as well as additional objects and advantages thereof will be more fully understood hereinafter as a result of a detailed description of preferred embodiments taken in conjunction with the following drawings in which.

DETAILED DESCRIPTION OF PREFERRED EMBODIMENTS

Figure 1:
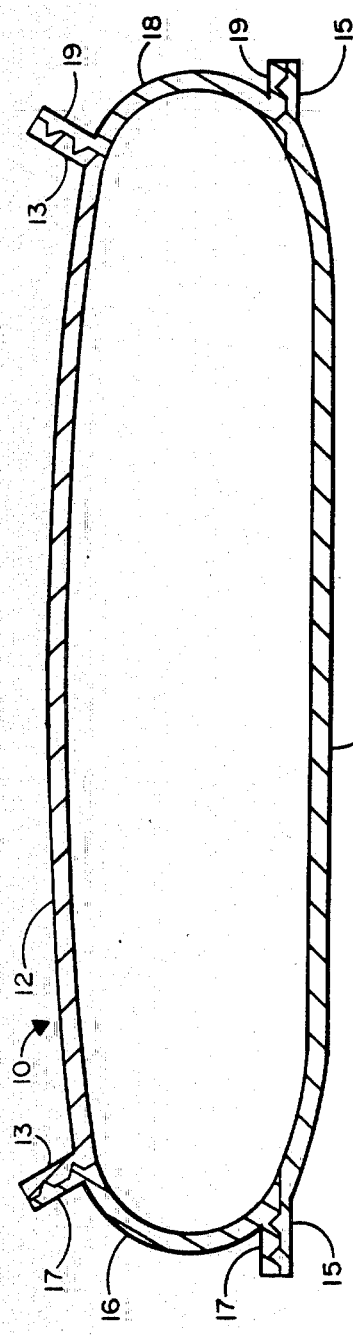
FIG. 1 is a cross sectional schematic view of a four part mold comprising the apparatus of the present invention.
Figure 2:
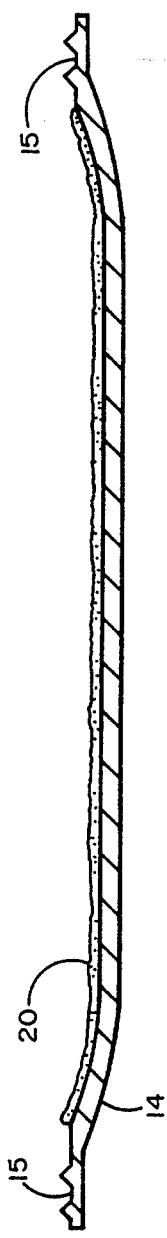
FIG. 2 is a cross sectional schematic view of the bottom part of the mold of FIG. 1 shown after the laminating step of the present invention has been accomplished.
Figure 3:
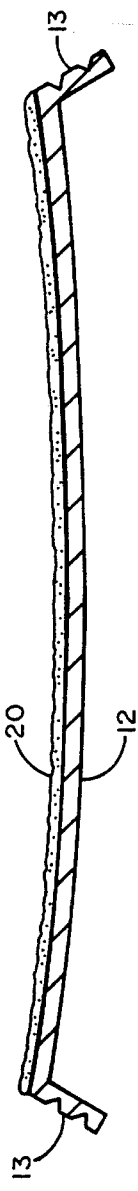
FIG. 3 is a cross sectional schematic view of the top part of the mold of FIG. 1 also shown after the laminating step of the present invention has been accomplished.
Figure 4:
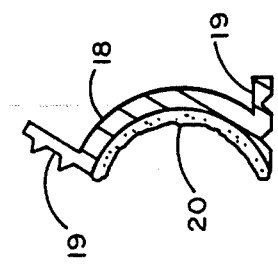
FIGS. 4 and 5 are cross sectional schematic views of the two side rail parts of the mold of FIG. 1 shown after the laminating step of the present invention has been accomplished.
Figure 5:
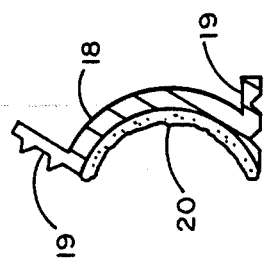

The novel apparatus of the present invention is illustrated in FIG. 1. As seen in FIG. 1, a mold 10 of the present invention comprises four parts, an upper part 12, a bottom part 14 and two side rail parts 16 and 18, respectively. As seen further in FIG. 1, each mold part has an inside surface which is adapted to be substantially congruent with the exterior surface of the object to be manufactured using the mold 10. Furthermore, each such mold part has two flanges, each such flange having been designed to mate with a corresponding flange of the adjacent mold part so that by use of clamps (not shown) the mold parts can be assembled in the configuration shown in cross section in FIG. 1 and held together in place by the flanges. More specifically, top part 12 has flanges 13, bottom part 14 has flanges 15, left side rail part 16 has flanges 17 and right side rail part 18 has flanges 19. The mold may be made of metal, plastic or other suitable material.

The process of the present invention includes providing the disassemblable mold of FIG. 1, disassembling the mold, and applying a clear gel coat to the interior surface of each such mold part. The gel coat gives a high gloss finish to the fabricated object after the process of the invention is completed and the mold has been removed. After the gel coat has been applied, the basic structure of the object is initiated by applying laminations of a resin and reinforcing material mixture such as fiberglass and resin to the interior surface of each of the mold parts. This step of the process is illustrated in FIGS. 2–5 where it is shown that each disassembled mold part 12, 14, 16 and 18, respectively, is coated with laminations 20 of the aforementioned resin and reinforcing material mixture. If the object being manufactured is for example a surfboard, the process of the present invention may in addition include the step of spraying a design on the board surface using desired colors and trademark designs prior to applying the resin laminations.

Figure 6:
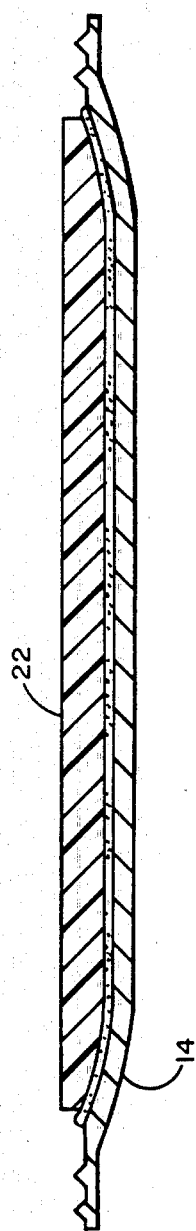
FIGS. 6 and 7 are cross sectional schematic views of the bottom and top parts of the mold of FIG. 1, respectively, shown after the vacuum applying step of the present invention has been accomplished.
Figure 7:
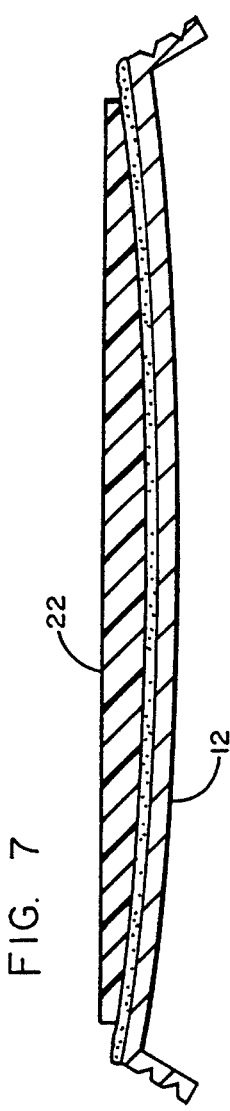

In any case, the next step of the process of the present invention which is illustrated schematically in FIGS. 6 and 7, comprises the step of applying a more structurally durable plastic layer to at least each of the top and bottom parts of the mold 10. More specifically, in at least one embodiment of the present invention this step comprises applying a layer 22 of toluene diisocyanate commonly referred to as TDI to the applied lamination surface of the bottom part 14 and top part 12 illustrated in FIGS. 6 and 7, respectively. TDI is normally applied in the form of a foam to the laminate. However, in order to secure the TDI to the underlying laminate surface, the applicant has discovered the highly advantageous step of applying a vacuum to each part 12 and 14 such as by means of a vacuum bag and vacuum pump until the TDI foam is cured and strongly adhered to the underlying laminate structure.

Figure 8:
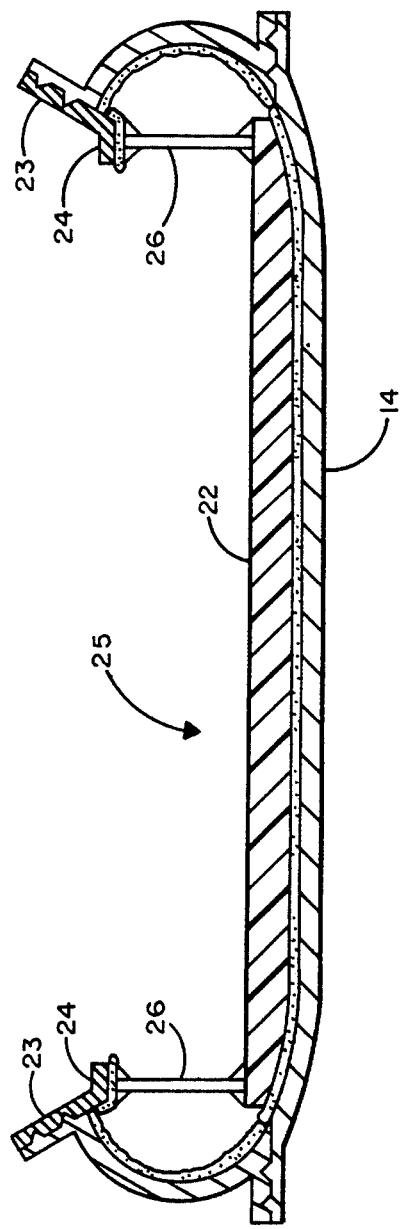
FIG. 8 is a cross sectional schematic view of the side rail parts connected to the bottom part of the present invention and to which have been added in one particular embodiment thereof, an optional L-shaped mold and dowels during the process of manufacture of the present invention.

The next step of the process of the present invention comprises the step of affixing the side rail parts 16 and 18 to the bottom part 14 thereby creating an open cavity 25 as seen best in FIG. 8. FIG. 8 also illustrates certain optional embodiments of the process of the present invention comprising the steps of utilizing an elongated mold portion 23 having an L-shaped step 24. In addition, the process may optionally include the step of applying a plurality of dowels 26 between the L-shaped portion 24 of the elongated mold portion 23 and the surface of the TDI layer 22 on the bottom part 14. The purpose of the optional steps relating to the elongated mold portion 23 and dowels 26 is to provide additional reinforced structure for receiving the top part 12 of the mold during the fabrication process.

Figure 9:
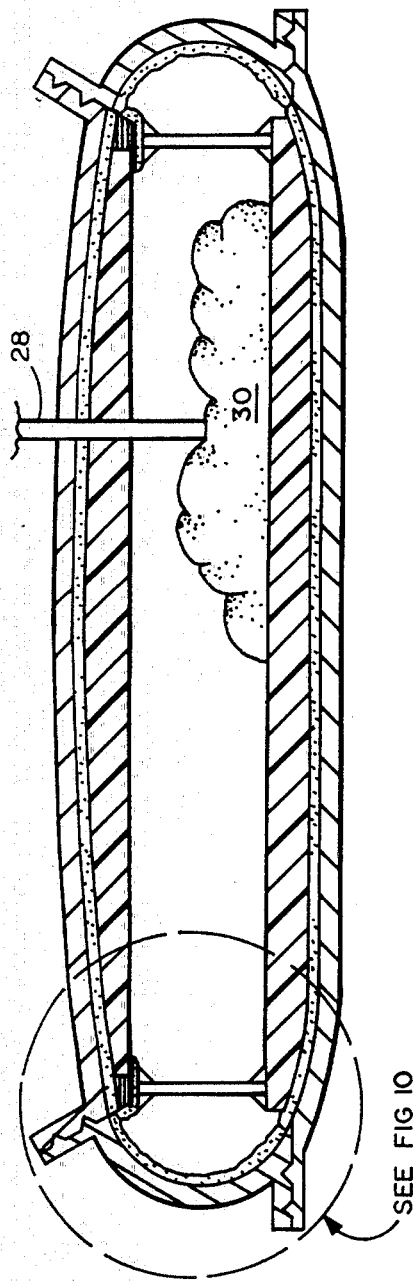
FIG. 9 is a cross sectional schematic view of the reassembled mold of FIG. 1 shown during application of the foam material into the interior of the mold during the last step of the process.

Whether or not the optional step of the preferred embodiment relating to the portions 23 and 24 as illustrated in FIG. 8 is employed, the next step of the process of the present invention comprises coating the interior of the cavity 25 (including the inwardly facing portion of the L-shaped portion 24 of the elongated mold 23 if it is used) with a resin and reinforcing material mixture such as fiberglass thereby adding further reinforcing structure to the object being manufactured and thereby forming an L-shaped step along the edge of the opening of the cavity if the optional portions 23 and 24 are utilized. If optional portion 23 is in fact employed in the invention, the next step comprises allowing the resin mixture to become structurally strong and then removing the elongated mold 23 thereby exposing an L-shaped step about the opening in the cavity. In either case, the remaining steps in the process comprise applying strips of resin and reinforcing material to the L-shaped step if it is present and to the outer interior edge of the top portion of the mold 12. In the next step the cavity 25 is closed by connecting the top part 12 to the rail parts 16 and 18, respectively and then allowing the resulting assembly to cure and thereby become hardened. An additional optional portion of the present invention comprises the step illustrated in FIG. 9. More specifically, particularly advantageous when using the process of the present invention to fabricate a surfboard is the optional step of adding a curable foam material 30 to the interior of the cured assembly. As seen in FIG. 9 this may be accomplished by using a suitable hose 28 connected to a pressurized source of such foam. The application of such foam material in the manner shown in FIG. 9 is well-known in the art and need not be described in further detail herein.

Figure 10:
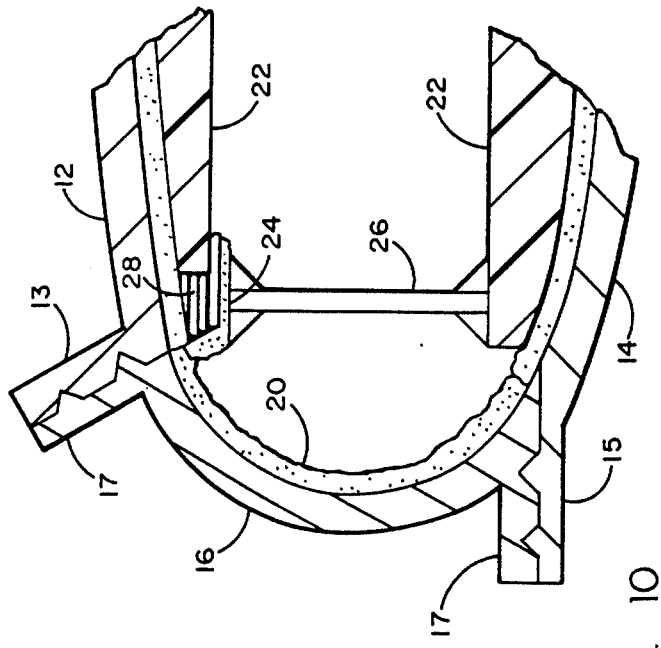
FIG. 10 is a substantially enlarged view of the encircled portion of FIG. 9 illustrating some of the detailed structure utilized in the process of the present invention.

The detailed structure of a portion of the interior of the molded assembly using the process of the invention herein disclosed is illustrated in the enlarged view of FIG. 10. As seen in FIG. 10, three of the four parts of the mold, namely, parts 12, 14 and 16 are interconnected by their respective flanges and presumed to be held together by conventional means such as C-clamps or other such clamps whereby to form an enclosed mold the interior surface of which has been treated in accordance with the steps hereinabove described. The resultant structural configuration, the aforementioned steps having been previously completed, are shown in FIG. 10. More specifically, it is seen that the contiguous inner surface of the respective mold parts 12, 16 and 14 are coated with a substantially continuous layer of resin and reinforcing material mixture such as fiberglass and resin. The exterior surface of the resin layer, that is, the surface in contact with the interior surface of the mold parts is coated first with a layer of gel coat. Furthermore, it is seen that the top and bottom mold parts 12 and 14, respectively, have received in addition to the lamination layers 20, respective layers of a more structurally substantial material such as toluene diisocyanate commonly referred to as TDI identified in FIG. 10 by the reference numeral 22.

The structure of FIG. 10 also demonstrates the object configuration assuming that the optional elongated mold part 23 including the L-shaped step 24 has been used in the process of the invention. The result is illustrated in FIG. 10 where it is shown that the top mold part 12 has been connected to the remaining mold parts to fully enclose cavity 25 and wherein the top mold part 12 rests on a plurality of strips 28 of resin and fiberglass or other reinforcing material mixture on the L-shaped ledge 24 which is in turn supported at periodic points along the perimeter thereof by a plurality of dowels 26. Dowels 26 are placed vertically within the cavity 25 underlying the L-shaped ledge 24 and resting on the TDI layer 22 of the bottom mold part 14. As seen further in FIG. 10, the dowel 26 may preferably be secured in place by applying a selected amount of resin material to the top and bottom ends of each such dowel 26 to prevent the movement of the dowel during the fabrication process prior to the curing of the optionally added foam material 30 disucssed previously in conjunction with FIG. 9. It should be noted that the addition of the foam material 30 to the interior of the chamber 25 subsequent to the completion of the reassembling of the mold parts as described above, may also be accomplished subsequent to curing of the exterior structure of the demolded object. It should also be noted that the bottom and top mold parts of the present invention may provide suitable additional apertures for receiving fin boxes and leash plugs when the object being manufactured is for example, a surfboard.

It will now be understood that what has been disclosed herein comprises a novel process for fabricating a closed, generally flat object such as a surfboard and an apparatus consisting of a unique mold for carrying such a process. The mold of the present invention comprises in a preferred embodiment, four mold parts, namely, a bottom part, a top part and a pair of side parts. These parts each contain suitable interconnecting flanges to allow the mold to be assembled during the fabrication process which is also disclosed above. The mold is unique in that the aforementioned parts provide means for carrying out the process of the present invention in a simple and expedient manner without requiring unique labor skills that would otherwise increase fabrication costs for fabricating plastic resin objects. Furthermore, the structure of the mold parts is specifically designed to permit a unique step carried out in the present invention, namely, the step of subjecting at least two of the separated parts to a vacuum pressure for adhering a more durable structural component such as toluene diisocyanate to those respective parts. The bottom part of the mold of the present invention has a flange extending radially around its perimeter, the flange forming a substantially continuous surface lying in a unitary plane. The pair of side parts each has a pair of flanges, a first one of the side part flanges is adapted to mate congruently with the flange of the bottom part and the second of said side part flanges is displaced from the first side part flange in elevation by an acute angle. Finally, the top part of the mold of the present invention has a flange extending around its perimeter and is adapted to mate congruently with the second side part flanges of each of the aforementioned side parts.

The process of the present invention may optionally include the aforementioned novel mold of the invention and includes the steps of applying suitable laminations of resin and reinforcing material mixture to each of the mold parts, applying the layer of toluene diisocyanate to at least two of the mold parts, subjecting those parts to a vacuum until the layers of toluene diisocyanate are each firmly adhered to the respective laminations, and then affixing the side rail parts to the bottom part to create a cavity into which may be optionally attached an elongated mold having L-shaped protrusions extending inwardly into the cavity of the mold parts. The interior surface is then additionally coated with a resin and reinforcing material mixture such as resin impregnated fiberglass and if the optional elongated mold part including the L-shaped protrusions is used, the cavity coating step includes coating the L-shaped step along the edge of the opening of said cavity and then allowing the resin mixture to become structurally strong and removing the elongated mold thereby exposing an L-shaped step about the opening in the cavity. The final steps of the process of the present invention comprise connecting the top part of the mold and the side rail parts of the mold forming the aforementioned cavity and then allowing the resultant assembly to cure. Fabrication may then be optionally completed by filling the interior of the assembled mold with a spray curable foam to fill the interior cavity.

Those having skill in the art to which the present invention pertains will now, as a result of the applicant's teaching herein, appreciate that various modifications and additions may be made to the apparatus and method of the present invention. By way of example, it will now be apparent to those having skill in the relevant arts that materials other than the ones specifically referred to hereinabove, may be appropriate for use in the process and apparatus of the present invention. More specifically, it has been discovered that in an alternative embodiment of the present process, the step of applying toluene diisocyanate may be replaced by applying a urethane elastomer. However, all such modifications and additions are deemed to be within the scope of the invention which is to be limited only by the claims appended hereto.

I claim:

1. A process for fabricating a closed, generally flat, object such as a surfboard, said process comprising the following steps:
   (a) providing a disassemblable mold having at least four parts comprising a bottom part, a top part and a pair of side rail parts, the interior surface of said mold having the desired shape of the exterior surface of said object;
   (b) disassembling said mold and applying a clear gel coat to the interior surface of each said mold part;
   (c) applying laminations of a resin and reinforcing material mixture to each of said mold parts;
   (d) applying a layer of toluene diisocyanate to at least said top and bottom parts;
   (e) subjecting said top and bottom parts to a vacuum until said layers of toluene diisocyanate are each firmly adhered to the respective laminations of said mixture;
   (f) affixing the side rail parts to the bottom part and attaching an elongated mold to the side rail parts, said elongated mold having an L-shaped protrusion extending inwardly into the cavity of the mold parts, the bottom part of the "L" directed toward the center of the cavity;
   (g) coating the interior of the cavity and the inwardly facing portion of the L-shaped portion of the elongated mold with a resin and reinforcing material mixture thereby forming an L-shaped step along the edge of the opening of said cavity;
   (h) allowing the resin mixture to become structurally strong and removing the elongated mold thereby exposing an L-shaped step about the opening in said cavity;
   (i) applying strips of resin and reinforcing material mixture to said L-shaped step and closing said cavity by connecting said top part to said rail parts; and
   (j) allowing the resulting assembly to cure.

2. The process for fabricating recited in claim 1 further comprising the step of:
   (k) adding a curable foam to the interior of the cured assembly.

3. The process for fabricating recited in claim 1 further comprising the step of:
   securing a plurality of dowels at spaced locations between said L-shaped step and said layer of toluene diisocyanate on said bottom part before closing said cavity.

4. A process for fabricating a closed, generally flat, object such as a surfboard, said process comprising the following steps:
   (a) providing a disassemblable mold having at least four parts comprising a bottom part, a top part and a pair of side rail parts, the interior surface of said mold having the desired shape of the exterior surface of said object;
   (b) disassembling said mold and applying a clear gel coat to the interior surface of each said mold part;
   (c) applying laminations of a resin and reinforcing material mixture to each of said mold parts;
   (d) applying a layer of toluene diisocyanate to at least said top and bottom parts;
   (e) subjecting said top and bottom parts to a vacuum until said layers of toluene diisocyanate are each firmly adhered to the respective laminations of said mixture;
   (f) affixing the side rail parts to the bottom part forming a cavity therebetween;
   (g) coating the interior of the cavity with a resin and reinforcing material mixture;
   (h) allowing the resin mixture to become structurally strong;
   (i) closing said cavity by connecting said top part to said rail parts; and
   (j) allowing the resulting assembly to cure.

5. The process for fabricating recited in claim 4 further comprising the step of:
    (k) adding a curable foam to the interior of the cured assembly.

6. A process for fabricating a closed, generally flat, object such as a surfboard, said process comprising the following steps:
    (a) providing a disassemblable mold having at least four parts comprising a bottom part, a top part and a pair of side rail parts, the interior surface of said mold having the desired shape of the exterior surface of said object;
    (b) disassembling said mold and applying a clear gel coat to the interior surface of each said mold part;
    (c) applying laminations of a resin and reinforcing material mixture to each of said mold parts;
    (d) applying a layer of urethane elastomer to at least said top and bottom parts;
    (e) affixing the side rail parts to the bottom part forming a cavity therebetween;
    (f) coating the interior of the cavity with a resin and reinforcing material mixture;
    (g) allowing the resin mixture to become structurally strong;
    (h) closing said cavity by connecting said top part to said rail parts; and
    (i) allowing the resulting assembly to cure.

7. A hollow multi-part mold used for fabricating a closed, generally flat, object such as a surfboard, the mold of the type having an interior surface shape substantially congruent with the desired shape of the exterior surface of the object, the mold comprising:
    a bottom part having a flange extending radially around its perimeter, said flange forming a substantially continuous surface lying in a unitary plane;
    a pair of side parts, each such side part having a pair of flanges, a first one of said side part flanges being adapted to mate congruently with the flange of said bottom part and the second of said side part flanges being displaced in elevation relative to said first side part flange by an acute angle; and
    a top part having a flange extending around its perimeter, said top part flange being adapted to mate congruently with said second side part flanges of each said side part.

* * * * *